United States Patent [19]

Layton

[11] 4,024,290

[45] May 17, 1977

[54] BULKING AGENT FOR FOODS

[75] Inventor: Roger M. Layton, Buffalo Grove, Ill.

[73] Assignee: G. D. Searle & Co., Chicago, Ill.

[22] Filed: Mar. 22, 1976

[21] Appl. No.: 668,759

[52] U.S. Cl. .............................. 426/548; 426/658; 536/120; 426/565; 426/571; 426/660
[51] Int. Cl.$^2$ ..................... A23L 1/09; A23L 1/236
[58] Field of Search ............... 426/548, 658; 536/4, 536/120

[56] References Cited

UNITED STATES PATENTS

| | | | |
|---|---|---|---|
| 3,651,221 | 3/1972 | Conrad et al. | 426/548 X |
| 3,741,776 | 6/1973 | Mitsuhashi et al. | 426/548 X |
| 3,766,165 | 10/1973 | Rennhard | 426/548 X |
| 3,865,957 | 2/1975 | Schleweck et al. | 426/548 |

FOREIGN PATENTS OR APPLICATIONS 2,133,428   1/1973   Germany ........................... 426/658

OTHER PUBLICATIONS

Levene et al., *Science*, 85, No. 2214 (1937), p. 550.

*Primary Examiner*—A. Louis Monacell
*Assistant Examiner*—Esther L. Massung
*Attorney, Agent, or Firm*—John J. McDonnell

[57] ABSTRACT

The present invention encompasses a bulking agent suitable for incorporating into formulated foods. The bulking agent of the present invention is prepared by condensation of glucose and sorbitol in the presence of an acid-ion exchange resin. The bulking agent of the present invention provides the functions and bulk of about the same weight of sucrose when incorporated into formulated foods. The bulking agent of the present invention is most advantageously used in conjunction with high intensity sweeteners.

8 Claims, No Drawings

BULKING AGENT FOR FOODS

A number of factors create a need for low-cost bulking agents suitable for incorporation into foods. For example, there is a general recognition of the association of dental caries and obesity with sucrose in modern diets. At the same time there are high intensity sweeteners available to replace the taste of sucrose. However, sucrose does more than simply provide a sweet taste to formulated food products; it provides texture, moisture retention properties, density and appearance to food products. An agent is therefore needed to replace the bulk of sucrose so as to retain the above stated desired properties in food products and preferably the agent should be low in calories with essentially non-digestible agents being most preferred. Bulking agents also have the effect of replacing dietary fiber deficiency in modern diets. Bulking agents with high water binding capacity are useful in providing moistness while preserving intermediate moisture foods.

The prior art teaches the use of 4-O-α-D-glucopyranosyl-D-sorbitol (maltitol) U.S. Pat. No. 3,741,776 and 6-O-α-D-glucopyranosyl-D-sorbitol (isomaltitol) U.S. Pat. No. 3,865,957 as bulking agents for food. The isomeric β-anomers of glucosylsorbitol are known as compounds per se, but not as food additives, Bourne et al. Chemistry and Industry 1047 (1959), Levene and Kuna, Science 85, 550(1937), and Smith et al. J. Amer. Chem. Soc. 73, 4891 (1951). Reaction conditions described in Chemical Abstracts 60-15973C do not produce a satisfactory bulking agent for foods.

Unexpectedly the condensation of glucose and sorbitol in the presence of an acid ion exchange resin produces a bulking agent suitable for incorporation into formulated foods.

The present invention encompasses a bulking agent for incorporation into formulated foods, wherein formulated foods containing the bulking agent have approximately the texture, moisture retention properties, appearance, and density of formulated foods containing the same percent by weight of sucrose; said bulking agents are prepared by the process of reacting at 120°-200° C under reduced pressure, 1-1.2 parts of glucose with about 1 part of sorbitol in the presence of 0.01-0.2 parts of an acid ion exchange resin for 30-360 minutes, dissolving the reaction product in water, neutralizing the resulting solution, separating the acid-ion exchange resin, removing water and cooling until the bulking agent becomes viscous and forms a glass.

The bulking agent prepared by the above method contains as a major component about 70% of the isomeric β-anomers of glucosylsorbitol 1-O-β-D-glucopyranosyl-D-sorbitol
2-O-β-D-glucopyranosyl-D-sorbitol
3-O-β-D-glucopyranosyl-D-sorbitol
4-O-β-D-glucopyranosyl-D-sorbitol
5-O-β-D-glucopyranosyl-D-sorbitol
6-O-β-D-glucopyranosyl-D-sorbitol and minor components about 15% of sorbitol and 15% other carbohydrate entities.

The bulking agent of the present invention may be further purified by the removal of residual sorbitol to render the bulking agent essentially non-digestible. This mixture essentially comprises the isomeric β-anomers of glucosylsorbitol set out as above.

Either the bulking agent alone or the bulking agent with sorbitol removed may be combined with high intensity sweeteners in amounts effective to render the bulking agent as sweet as an equal weight of sucrose. The preferred high potency sweeteners are the methyl ester of L-aspartyl-L-phenylalanine, saccharin, and cyclamate. High intensity sweeteners, their intensity of sweetness, their combination with other bulking agents and incorporation into food products is well known — U.S. Pat. No. 3,741,776, U.S. Pat. No. 3,865,957, and U.S. Pat. No. 3,492,131. The bulking agents of the present invention having effective amounts of high intensity sweeteners are thick nd viscous and are preferably either warmed to increase their fluidity or diluted with 5–50% (preferably about 30%) water to form a syrup with reduced viscosity for ease of handling.

The bulking agents of the present invention may be added directly to formulated foods, as a separate ingredient and an appropriate high intensity sweetener may likewise be added as a separate ingredient to accomplish the same final effect in formulated foods.

The bulking agents of the present invention may be combined with modified starch with D.E. ratios of about 4–20 and spray dried using conventional spray drying technology. The spray dried product may be used in conjunction with high intensity sweeteners and incorporated in free flowing powdered food products.

In producing the product of the present invention the ratio of glucose to sorbitol is preferably 1–1.2 parts glucose to about 1 part of sorbitol and in general a slight excess 5–10% of glucose is preferred.

Suitable acid ion exchange resins are described in *Kirk-Othmer Encyclopedia of Chemical Technology* 2nd Edition, Volume 71, pages 873–875. Preferred acid ion exchange resins are best exemplified by the principal sulfonated styrene-divinylbenzene copolymer products (Amberlyst 15, Amberlite IR-120, Amberlite IR-200, Dowex 50, Dowex 50W, Dowex MPC-1, Duolite C-20, Duolite C-25, Ionac C-250). All are spherical products prepared by sulfonation of styrene-divinylbenzene copolymer beads with the sulfonating agent of choice, sulfuric acid, chlorosulfonic acid, or sulfur trioxide. Prior swelling of the beads with a nonreactive swelling agent is generally required for rapid and uniform sulfonation with a minimum of breakage.

The producers of these resins are:

| Company | Location | Trademark |
| --- | --- | --- |
| Diamond Alkali Co. | Redwood City, Calif. | Duolite |
| The Dow Chemical Co. | Midland, Mich. | Dowex |
| Ionac Chemical Corp. | Birmingham, N. J. | Ionac |
| Rohm & Haas Co. | Philadelphia, Pa. | Amberlite |

Acid ion exchange resin is used in about 1–20% by weight in respect to the other reactants.

Mineral acids such as sulfuric and hydrochloric acid produce a less desirable product. p-Toluenesulfonic acid produces a suitable product but the acid is removed with difficulty.

The reaction is conducted at about 120°–200° C generally at less than atmospheric pressure. The pressure is lowered to remove water vapor formed during the reaction and thus drives the reaction to completion. Those skilled in the chemical arts will recognize that lower temperature will generally require lower pressures to remove the water vapor. It is desirable that the temperature be about 120° C so that the reaction mixture can be efficiently stirred. The preferred temperature is about 160° at a pressure of 25 mm of mercury. Water can be added initially to facilitate mixing but the water is not required. The reaction time is about 30–360 minutes depending on temperature, pressure and amount of acid ion exchange resin.

The preferred method of preparing the bulking agent of the present invention is set out in Example 1 hereinafter set forth.

The bulking agent of the present invention can conveniently be incorporated into formulated foods such as candy, cookies, ice cream, pastries, cakes, jellies, preserves, chocolate coatings, puddings, soft drinks, syrups, etc. For ease of handling the bulking agent of the present invention is added as a 70–95% aqueous solution which has a syrup like consistency.

Cakes having similar functional properties are prepared by replacing 90.8 parts sugar (sucrose) in the following recipe with 90.8 parts bulking agent prepared by the method set out in Example 1.

Cakes are baked according to the recipe and instruction of *Practical Baking*, William J. Sultan, 2nd edition, p. 356, AVI Publishing Co., Inc. Westport, Conn., 1969. The proportions of ingredients remain the same except for sugar which is replaced by the bulking agent of Example 1.

| Bulking Agent | 101.0 | parts |
| Saccharin | 0.075 | parts |
| Salt | 1.42 | parts |
| W.F. Milk powder | 7.54 | parts |
| Cake flour | 83.0 | parts |
| Shortening | 37.7 | parts |
| Fresh egg white | 56.7 | parts |
| Baking powder | 4.71 | parts |
| Water | 42.6 | parts |

The cake ingredients are mixed 8 minutes and then baked for 30 minutes at 350° F in a 7½ inch square aluminum pan. This cake has essentially the texture, appearance, and moist properties of cakes baked with 101.0 parts of sugar.

The bulking agent of the present invention can conveniently be incorporated into intermediate moisture food products containing 15–50% moisture such as dog food, pastries, and confections.

The bulking agent of the present invention by virtue of its non-digestibility is dietary fiber and, therefore, useful in conjunction with refined formulated foods, especially those with high nutrient density. The bulking agent of the present invention is also suitable for partially replacing fats in formulated food products such as confections and salad dressings.

The following examples are illustrative of methods of producing the bulking agent of the present invention and of incorporating the bulking agent into formulated foods and should not be construed as limiting the invention. Parts are in parts by weight and the relationship between parts by weight and parts by volume is the same as for that between grams and milliliters. The temperature is ° C unless otherwise stated.

EXAMPLE 1

A reaction vessel equipped with mechanical stirrer and a vacuum outlet is charged with 180.2 parts glucose, 182.2 parts sorbitol, 40 parts water and 14.5 parts of an acid ion exchange resin (an acid ion exchange resin sold under the tradename Amberlite IR-120 by Rohm and Haas, Philadelphia, Pa.) is suitable for practicing this invention. This ion exchange resin prior to charging is washed with water to remove free mineral acid. The reaction mixture is heated with stirring at about 160° at a pressure of 25 mm of mercury. Heating and stirring is continued under vacuum for 1½ to 2 hours. Then the heating discontinued, stirring ceased and the vacuum broken. The product forms a glass upon cooling whereupon it is dissolved in 400 parts of water and the solution is brought to a pH of 7 with 2N sodium hydroxide. The resin beads are removed by filtration and the filtrate is concentrated by removing water in vacuo with mild heating at approximately 70°. Upon cooling the bulking agent forms a viscous syrup comprising as a major component about 70% of the isomeric β-anomers of glucosylsorbitol:

1-O-β-D-glucopyranosyl-D-sorbitol
2-O-β-D-glucopyranosyl-D-sorbitol
3-O-β-D-glucopyranosyl-D-sorbitol
4-O-β-D-glucopyranosyl-D-sorbitol
5-O-β-D-glucopyranosyl-D-sorbitol
6-O-β-D-glucopyranosyl-D-sorbitol;
15% sorbitol; and 15% of minor carbohydrate components.

A 10% aqueous solution of this material has $[\alpha]_D^{25}$ $H_2O$ of + 28.10° and a 70% solution in water has a viscosity of 225 cps at 24° C using spindle No. 2, LVT Brookfield Viscometer.

EXAMPLE 2

Sorbitol is removed from the bulking agent of Example 1 by column chromatography. 200 Parts of the bulking agent of Example 2 are reacted with 800 parts by volume of acetic anhydride in 500 parts by volume of pyridine for 24 hours at room temperature. The reaction mixture is poured on ice and extracted with chloroform. 525 Parts of the peracetylated product is placed on a silica gel column packed with 4200 parts silica gel (Woelm No. 1). Acetylated glucosylsorbitol fraction is eluted in 50/50 methanol/acetone and removal of solvent provides 300 parts of a viscous syrup. The acetate moieties are removed by hydrolysis in 2500 parts by volume of methanol containing 900 parts by volume of 0.5% sodium methoxide for 1 hour. The reaction mixture is decationized with acidic ion exchange resin about 2 parts until the solution is neutral. The ion exchange resin is removed by filtration and the solvent is removed to provide viscous syrup which is shown by thin layer chromatography to contain essentially isomeric β-anomers of glucosylsorbitol:

1-O-β-D-glucopyranosyl-D-sorbitol
2-O-β-D-glucopyranosyl-D-sorbitol
3-O-β-D-glucopyranosyl-D-sorbitol
4-O-β-D-glucopyranosyl-D-sorbitol
5-O-β-D-glucopyranosyl-D-sorbitol
6-O-β-D-glucopyranosyl-D-sorbitol.

This material was tested for its digestibility as follows: 6 Rats are allowed to feed ad libitum for 10 days on a diet comprising 30% experimental compound and 70% rat feed. In the positive control the experimental compound is 30% glucose and in the negative control the experimental compound is 30% cellulose. Digestibility is measured by weight loss or gain using the controls as the extremes. The results are as follows:

| COMPOUND | DIGESTIBILITY |
| --- | --- |
| Glucose ( + control) | 100% |
| Isomaltitol (U.S. Pat. 3,865,957) | 80% |
| Glucosylmannitol | 80% |

-continued

| COMPOUND | DIGESTIBILITY |
|---|---|
| Glucosylfructose | 50% |
| Polyfructose | 50% |
| L-Raffinose | 40% |
| Polydextrose | 20% |
| *Maltitol (U.S. Pat. 3,741,776) | 10% |
| Product prepared in Example 2 | 0% |
| Cellulose ( — control) | 0% |

*Maltitol has been reported to cause diarrhea; Fusoa Noito, New Food Industry 13, No. 9 (1971), page 7.

EXAMPLE 3

Sorbitol can be removed directly without acetylation by elution of 1 part of the bulking agent of Example 1 on 50 parts of celite with saturated n-butyl alcohol in water as eluant.

EXAMPLE 4

PRESERVES

PROCEDURE:

The bulking agent of Example 1 is dissolved in distilled water with heat. The microcrystalline cellulose and carboxymethylcellulose are added separately until mixed well. All ingredients but the methyl ester of L-aspartyl-L-phenylalanine as sweetener are then mixed in. The temperature is 180° F. The water loss is made up. It is cooled and the sweetener is added at 115° F. It is then packed in a canning jar.

STRAWBERRY JELLY

| | Parts by weight |
|---|---|
| Distilled water | 228.45 |
| Bulking Agent of Example 1 | 80.00 |
| Strawberry juice | 80.00 |
| (Microcrystalline cellulose) Avicel RC-591 | 3.20 |
| Natural flavor | 3.00 |
| Carrageenan DG | 1.28 |
| (Carboxymethyl cellulose) 7MF | 1.20 |
| Methyl ester of L-aspartyl-L-phenylalanine | 1.00 |
| Fumaric Acid | 0.48 |
| Potassium Citrate | 0.44 |
| Carrageenan GH | 0.32 |
| Citric Acid | 0.32 |
| Color | 0.10 |
| Potassium sorbate | 0.08 |
| Sodium Benzoate | 0.08 |
| Artificial flavor | 0.05 |
| | 400.00 |

STRAWBERRY PRESERVES

| | Parts by weight |
|---|---|
| Distilled water | 228.55 |
| Bulking agent of Example 1 | 80.00 |
| Quick Frozen Strawberries | 80.00 |
| (Microcrystalline cellulose) Avicel RC-591 | 3.20 |
| Natural flavor | 3.00 |
| Carrageenan DG | 1.28 |
| CMC 7MF | 1.20 |
| Methyl ester of L-aspartyl-L-phenylalanine | 1.00 |
| Fumaric acid | 0.48 |
| Potassium Citrate | 0.44 |
| Carrageenan GH | 0.32 |
| Citric Acid | 0.32 |
| Color | 0.10 |
| Potassium Sorbate | 0.08 |
| Sodium Benzoate | 0.08 |
| Artificial flavor | 0.05 |
| | 400.00 |

EXAMPLE 5

ICE CREAM

| | | |
|---|---|---|
| Cream (44.6% milk fat) | 3.6 | lbs. |
| Plain condensed skim milk (26.7% T. Solids) | 32.30 | lbs. |

-continued

ICE CREAM

| | | |
|---|---|---|
| Bulking agent of Example | 15.14 | lbs. |
| Stabilizer/emulsifier | 1.876 | lbs. |
| Methyl ester of L-aspartyl-L-phenylalanine | 0.044 | lbs. |
| Water | 26.61 | lbs. |
| Annatto cheese color | 8 | mls |
| Pure vanilla extract flavor (double strength) | 97 | mls |

PROCEDURE:

All liquid ingredients* (except 4.57 lbs. water and vanilla flavor) are placed in a 10-gallon milk container and mixed well using a stainless steel dipper.

*Bulking agent is dissolved in water before it is added to the other liquid ingredients.

The milk container with the liquid ingredients is placed in a steam injected water bath.

All dry ingredients except the methyl ester of L-aspartyl-L-phenylalanine are added to the liquid ingredients with stirring. This mix is heated to 160° F for 30 minutes.

The pasteurized mix is homogenized at 160° F using a two stage Gaulin homogenizer (2000 psi 1st stage, 500 psi second stage) and the homogenized mix is cooled immediately to 38° F using a surface plate cooler. The mix is aged overnight before freezing. The methyl ester of L-aspartyl-L-phenylalanine is dissolved in water (4.57 lbs.) and added to the mix. Also, the vanilla flavor is added to the ice cream mix and mixed well with the hand stirrer. The ice cream mix is frozen using a continuous freezer (Cherry-Burrell) at 21.5° F drawing temperature and 70–80% overrun. The ice cream with the bulking agent is packed in ½ gallon containers and transferred to the hardening room.

EXAMPLE 6

CAKE

Cakes are baked according to the recipe and instruction of *Practical Baking*, William J. Sultan, 2nd Edition, p. 356, AVI Publishing Co., Inc., Westport, Conn., 1969. The proportions of ingredients remained the same except for sugar which is the bulking agent of Example 1. The weights of ingredients used are as follows:

| | | |
|---|---|---|
| Bulking agent of Example 1 | 101.0 | parts |
| Saccharin | 0.075 | parts |
| Salt | 1.42 | parts |
| W. F. Milk powder | 7.54 | parts |
| Cake Flour | 83.0 | parts |
| Shortening | 37.7 | parts |
| Water | 42.6 | parts |
| Fresh egg white | 56.7 | parts |
| Baking powder | 4.71 | parts |

The cake ingredients are mixed 8 minutes and then baked for 30 minutes at 350° F in a 7½ inch square aluminum pan. This cake has essentially the texture, luster and properties of cakes baked with 90.8 parts of sugar and 52.8 parts of water.

EXAMPLE 7

CANDY BASE

The candy base is cooked as per the recipe and instructions given in Gelatin Gum Drops, Formula 391, p. 477, *Candy Production: Methods and Formulas*, Walter L. Richmond, The Manufacturing Confectioner, Chicago, Illinois, 1948. The recipe is reduced but the proportion of ingredients is maintained. The weights are given below:

| | | |
|---|---|---|
| Agar-Agar | 22.8 | parts |
| Corn syrup | 117.5 | parts |
| Gelatin | 9.3 | parts |
| Water | 192.3 | parts |
| Bulking agent of Example 1 | 130.8 | parts |
| | 454.7 | parts |

High intensity sweetner, color and flavor, as desired. After cooling, the candy is poured into a 4 × 8 inch square cake pan which has been dusted with potato starch to prevent sticking. The candy is air dried for 9–10 days and then sealed in a plastic wrap.

EXAMPLE 8

| MARSHMALLOW | |
|---|---|
| | % by weight |
| 62 D.E. Corn Syrup | 39.0 |
| Distilled water | 18.24 |
| 225 Bloom Gelatin | 2.28 |
| Methyl ester of L-aspartyl-L-phenylalanine | 0.30 |
| Bulking agent of Example 1 (90% solution) | 40.14 |
| Vanilla, artificial and natural | 0.04 |

PROCEDURE:

Portion I: a 15.5% gelatin solution in water is prepared and the methyl ester of L-aspartyl-L-phenylalanine is added to the water which is warmed to dissolve both ingredients. The temperature should not exceed 130° F.

Portion II: Mix 90% bulking agent solution and the 62 D. E. Corn Syrup. Standardize moisture to 20–21%. Whisk Portion II in a water jacketed Kitchen Aid mixer, bring temperature up to 140° F and add Portion I and flavor to mixer. Whisk until mass holds its shape while slowly cooling to 105° F. Drop off marshmallows and dry in open air at room temperature. Dust with molding starch-sugar blend.

EXAMPLE 9

| CHOCOLATE COATING | | |
|---|---|---|
| Cocoa, 11% fat | 17.44 | parts |
| Non-fat dry milk solids | 7.85 | parts |
| Salt | 0.09 | parts |
| Methyl ester of L-aspartyl-L-phenylalanine | 0.26 | parts |
| Powdered Sugar | 10.90 | parts |
| Paramount-coating fat-Durkee | 37.06 | parts |
| Lecithin | 0.24 | parts |
| Bulking agent of Example in 87% aqueous solution | 26.16 | parts |

PROCEDURE:

Dry blendorize cocoa, milk solids, salt, methyl ester of L-aspartyl-L-phenylalanine and sugar. (use Waring Blendor). Add to the dry blend melted fat and lecithin, and warm to 140° F, and then add the 87% bulking agent solution. Blend thoroughly. Mix and cool to about 100°–105° F, or to proper viscosity for dipping or coating.

EXAMPLE 10

PUDDING

From Good Housekeeping Cookbook:

2 cups milk,
⅓ cup cornstarch,
⅓ cup sugar or bulking agent of Example 1
½ teaspoon vanilla
Intense sweetener to taste
Bring to a rolling boil. Pour into a mold and refrigerate.

EXAMPLE 11

| "TOOTSIE-ROLL" TYPE CANDY | | |
|---|---|---|
| | A | B |
| Sugar, Powdered | 16.03 | 15.819 |
| Cocoa | 10.13 | 9.158 |
| Methyl ester of L-aspartyl-L-phenylalanine | 0.42 | 0.677 |
| Bulking agent of Example 1 90% solution | 49.37 | 47.874 |
| Maltrin M050, Malto Dextrin | 10.97 | — |
| Starch, instant | 13.08 | 14.57 |
| Vanilla flavor | — | 1.248 |
| Butter flavor | — | 0.166 |
| High Protein concentrate | — | 10.4 |
| % TOTAL SWEETNESS DERIVED FROM intense sweetener (as calculated) | 82 | 88 |

PROCEDURE:

Dry blend powdered sugar, cocoa, methyl ester of L-aspartyl-L-phenylalanine and salt. (Hamilton Beach type mixer). Then add to the above blend, in a mixer, warmed 120° F bulking agent solution, malto-dextrin and starch. Blend in flavor, and bring texture to a soft pliable consistency with all ingredients thoroughly distributed. Shape and cut the candy on flat surface and wrap the individual pieces.

EXAMPLE 12

99.86 Parts of the bulking agent of Example 1 and 0.14 parts of saccharin (sodium salt of O-benzoic acid sulfamide) are dissolved in 300 parts water. The water is removed by heating at about 70° C under vacuum. Cooling provides a glass having approximately the sweetness per unit weight of sucrose.

EXAMPLE 13

0.35 Parts of the methyl ester of L-aspartyl-L-phenylalanine and 99.65 parts bulking agent of Example 1 are used to prepare a glass having approximately the sweetness per unit weight of sucrose by methods of Example 12.

EXAMPLE 14

98 Parts of the bulking agent and 2 parts of cyclamate (sodium salt of cyclohexylsulfonic acid) are used to prepare a glass having approximately the sweetness per unit weight of sucrose by methods of Example 12.

EXAMPLE 15

Following the procedure in Example 1, 200 parts glucose, 182.2 parts sorbitol, and 1.5 parts acid ion exchange resin without the addition of water is heated under vacuum for 6 hours and otherwise treated as in Example 1 to provide a suitable bulking agent.

EXAMPLE 16

An aqueous solution containing 50% solids wherein the solids are composed of about 50% D.E. 4–20 modified starch and about 50% bulking agent of Example 1 is fed into a conventional spray-drying apparatus at 180° F pressure of about 5000 psi. Inlet air is filtered and heated at about 450° F and the outlet air is discharged at about 225° F. Atomization is achieved in a whirl-jet or spray-dry nozzle. The parallel air flow and feed solution is simultaneously fed with the air flow rate being about 20,000 SCFM (standard cubic feet per minute). This procedure on a Swenson et al. apparatus provides a free flowing powder.

EXAMPLE 17

The procedure of Example 16 is repeated replacing the bulking agent of Example 1 with the bulking agent of Example 2.

What is claimed is:

1. A bulking agent suitable for incorporation into formulated foods, wherein formulated foods containing the bulking agent have approximately the texture, moisture retention capability, appearance, and density of formulated foods containing the same percent by weight of sucrose; said bulking agent prepared by the process of reacting at 120°–200° C under reduced pressure 1–1.2 parts of glucose with about 1 part of sorbitol in the presence of 0.01–0.2 parts of an acid ion exchange resin for 30–360 minutes, dissolving the reaction product in water, neutralizing the resulting solution, separating the acid-ion exchange resin, removing water and cooling until the bulking agent becomes viscous and forms a glass.

2. The bulking agent of claim 1 further purified by the removal of residual sorbitol to render the bulking agent essentially non-digestible.

3. The bulking agent of claim 1 further containing a high potency sweetener in amounts effective to render the bulking agent as sweet as an equal weight of sucrose.

4. The bulking agent of claim 3 further containing cyclamate, saccharin, or methyl ester of L-aspartyl-L-phenylalanine or mixtures thereof in amounts effective to render the bulking agent as sweet as an equal weight of sucrose.

5. The bulking agent of claim 2 further containing a high potency sweetener in amounts effective to render the bulking agent as sweet as an equal weight of sucrose.

6. The bulking agent of claim 5 further containing cyclamate, saccharin, or methyl ester of L-aspartyl-L-phenylalanine or mixtures thereof in amounts effective to render the bulking agent as sweet as an equal weight of sucrose.

7. Formulated food products wherein sucrose is replaced by an equivalent weight of the bulking agent of claim 3.

8. Formulated food products wherein sucrose is replaced by an equivalent weight of the bulking agent of claim 5.

* * * * *